United States Patent
Zhang et al.

(10) Patent No.: US 9,509,540 B1
(45) Date of Patent: Nov. 29, 2016

(54) METHODS AND APPARATUS FOR INCREASING THE NUMBER OF TRAINING AND DATA TONES IN WIRELESS COMMUNICATIONS SYSTEMS

(71) Applicant: Marvell International Ltd., Hamilton (BM)

(72) Inventors: Hongyuan Zhang, Fremont, CA (US); Mingguang Xu, San Jose, CA (US); Yakun Sun, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 15/043,102

(22) Filed: Feb. 12, 2016

Related U.S. Application Data

(60) Provisional application No. 62/115,794, filed on Feb. 13, 2015.

(51) Int. Cl.
*H04L 27/26* (2006.01)

(52) U.S. Cl.
CPC ....... *H04L 27/2611* (2013.01); *H04L 27/2615* (2013.01)

(58) Field of Classification Search
CPC ........... H04L 27/2613; H04L 27/2602; H04L 27/2675; H04L 27/2611; H04L 27/2615; H04L 27/362
USPC ................................................ 375/260, 295
See application file for complete search history.

(56) References Cited

U.S. PATENT DOCUMENTS

| | | | | |
|---|---|---|---|---|
| 8,619,907 B2* | 12/2013 | Mujtaba | ............... | H04B 7/0667 370/334 |
| 9,055,590 B2* | 6/2015 | Hassan | ............. | H04W 74/0808 |
| 2012/0163505 A1* | 6/2012 | Son | ...................... | H04L 27/2697 375/329 |
| 2013/0235836 A1* | 9/2013 | Roh | ...................... | H04L 1/0031 370/329 |
| 2015/0230256 A1* | 8/2015 | Yu | ......................... | H04W 72/08 370/329 |
| 2015/0236831 A1* | 8/2015 | Kang | ................... | H04L 5/0048 370/338 |
| 2015/0334708 A1* | 11/2015 | Lee | ................... | H04W 72/0446 370/329 |
| 2016/0112228 A1* | 4/2016 | Lee | ...................... | H04L 27/2613 375/267 |
| 2016/0197710 A1* | 7/2016 | Jones, IV et al. | .. | H04L 27/2657 370/329 |

OTHER PUBLICATIONS

IEEE 802.11-15/0132r15, Wireless LANs, Specification Framework for TGax, p. 1-43, Jan. 28, 2016.
IEEE Std 802.11™-2012, IEEE Computer Society, Part 11: Wireless LAN Medium Access Control (MAC) and Physical Layer (PHY) Specifications, 2793 pgs., Mar. 29, 2012.

(Continued)

*Primary Examiner* — Emmanuel Bayard

(57) ABSTRACT

Accordingly, systems and methods for managing power when the number of training and data tones are increased in a wireless communications system are provided. An L-SIG field is generated that includes a set of data and pilot tones, wherein the pilot tones are inserted between the data tones in the set of data and pilot tones. A plurality of training tones is added to the L-SIG field before and after the set of data and pilot tones. A symbol is generated that includes the L-SIG field, an L-LTF field, and a data field, wherein the training tones of the L-SIG field provide channel estimates for the data field. Power of the L-LTF field is managed relative to power of the L-SIG field in the generated symbol in a time domain.

20 Claims, 3 Drawing Sheets

(56) References Cited

OTHER PUBLICATIONS

IEEE Standard for Local and metropolitan area networks—Link Aggregation, IEEE Computer Society, 163 pgs., Nov. 3, 2008.

IEEE Std 802.11a-1999, Part 11: Wireless LAN Medium Access Control (MAC) and Physical Layer (PHY) specifications: High-speed Physical Layer in the 5 GHZ Band, 91 pgs, Sep. 1999.

* cited by examiner

METHODS AND APPARATUS FOR INCREASING THE NUMBER OF TRAINING AND DATA TONES IN WIRELESS COMMUNICATIONS SYSTEMS

CROSS REFERENCE TO RELATED APPLICATION

This disclosure claims the benefit of U.S. Provisional Application No. 62/115,794, filed Feb. 13, 2015, which is incorporated herein by reference in its entirety.

FIELD OF USE

The present disclosure relates generally to wireless communication systems, and more particularly to 802.11ax communications systems.

BACKGROUND

The amount of data tones that needs to be transmitted in wireless networks, such as in 802.11 wireless communications systems, continues to increase. Next generation 802.11ax wireless communications systems still rely on legacy protocols that limit the number of tones that can be used in transmission, for example, in a legacy-long training field (L-LTF) preamble, to 52 tones. This allows 48 to be used as data tones and the other four as pilot tones. Such limitations due to legacy protocol and preamble requirements reduce the amount of data that can be transmitted in the next generation 802.11ax wireless communications systems.

SUMMARY

Accordingly, systems and methods for managing power when the number of training and data tones are increased in a wireless communications system are provided. In some embodiments, a method for transmitting data in a wireless communications system is provided. An L-SIG field is generated that includes a set of data and pilot tones, wherein the pilot tones are inserted between the data tones in the set of data and pilot tones. A plurality of training tones is added to the L-SIG field before and after the set of data and pilot tones. A symbol is generated that includes the L-SIG field, an L-LTF field, and a data field, wherein the training tones of the L-SIG field provide channel estimates for the data field. Power of the L-LTF field is managed relative to power of the L-SIG field in the generated symbol in a time domain.

In some implementations, the wireless communications system is an 802.11ax wireless communications system. In some implementations, the power may be managed by reducing power of the L-LTF field to correspond to the power of the L-SIG field. In some implementations, power of each of the data, pilot, and training tones is reduced by 0.3 decibels. In some implementations, the power is managed by increasing the power in the L-SIG field relative to the L-LTF field as a result of adding the plurality of training tones.

In some implementations, the plurality of training tones includes first, second, third and fourth training tones, wherein the first tone and the second tone are added before the set of data and pilot tones and the third tone and the fourth tone are added after the set of data and pilot tones. In some implementations, the data and pilot tones each have a first power value, and wherein the training tones are added by adding the training tones with the first power value.

In some implementations, the symbol includes an L-STF field before the L-LTF field, a repetition of the L-SIG field, and at least one HE-SIG field that follows the L-SIG field. In such implementations, the data field may correspond to the at least one HE-SIG field.

In some implementations, the power is managed by scaling down the power of each tone in the L-LTF field in accordance with 10 log (n/l), wherein n represents a number of data, pilot, and training tones in the L-SIG field, and l represents a number of data and pilot tones in the L-SIG field.

In some embodiments, a system for transmitting data in a wireless communications system is provided. The system includes control circuitry configured to generate an L-SIG field that includes a set of data and pilot tones, wherein the pilot tones are inserted between the data tones in the set of data and pilot tones. The control circuitry is configured to add a plurality of training tones to the L-SIG field before and after the set of data and pilot tones. The control circuitry is configured to generate a symbol that includes the L-SIG field, an L-LTF field, and a data field, wherein the training tones of the L-SIG field provide channel estimates for the data field. The control circuitry is configured to manage the power of the L-LTF field relative to power of the L-SIG field in the generated symbol in a time domain.

In some implementations, the wireless communications system is an 802.11ax wireless communications system. In some implementations, the control circuitry configured to manage power is further configured to reduce power of the L-LTF field to correspond to the power of the L-SIG field. In some implementations, power of each of the data, pilot, and training tones is reduced by 0.3 decibels. In some implementations, the control circuitry configured to manage power is further configured to increase the power in the L-SIG field relative to the L-LTF field as a result of adding the plurality of training tones.

In some implementations, the plurality of training tones includes first, second, third and fourth training tones, wherein the first tone and the second tone are added before the set of data and pilot tones and the third tone and the fourth tone are added after the set of data and pilot tones. In some implementations, the data and pilot tones each have a first power value, and wherein the control circuitry configured to add the training tones is further configured to add the training tones with the first power value.

In some implementations, the symbol includes an L-STF field before the L-LTF field, a repetition of the L-SIG field, and at least one HE-SIG field that follows the L-SIG field. In such implementations, the data field may correspond to the at least one HE-SIG field.

In some implementations, the control circuitry configured to manage power is further configured to scale down the power of each tone in the L-LTF field in accordance with 10 log (n/l), wherein n represents a number of data, pilot, and training tones in the L-SIG field, and l represents a number of data and pilot tones in the L-SIG field.

BRIEF DESCRIPTION OF THE DRAWINGS

The details of one or more implementations are set forth in the accompanying drawings and the description below. Other features and various advantages will be more apparent upon consideration of the following detailed description, taken in conjunction with the accompanying drawings in which.

DETAILED DESCRIPTION

This disclosure generally relates to managing power in the transmission of additional training and data tones in a wireless communications system. For illustrative purposes, this disclosure is described in the context a wireless communications system implementing the 802.11ax protocol. It should be understood, however, that this disclosure is applicable to any other type of wireless communications system (e.g., any other orthogonal frequency domain (OFDM), a system implementing any other 802.11 protocol, or other wireless local or wide area network system).

Figure 1:
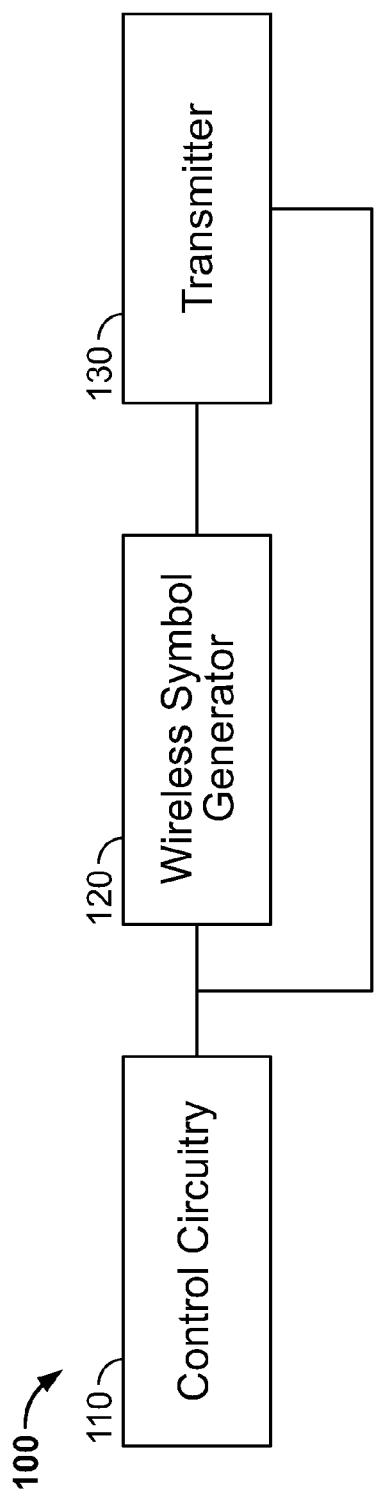
FIG. 1 is a diagram of an illustrative wireless communications system for transmitting additional training and data tones in accordance with an embodiment of the present disclosure.

FIG. 1 is a diagram of an illustrative wireless communications system 100 for transmitting additional training and data tones in accordance with an embodiment of the present disclosure. System 100 includes control circuitry 110, a wireless symbol generator 120 and a transmitter 130.

Figure 5:
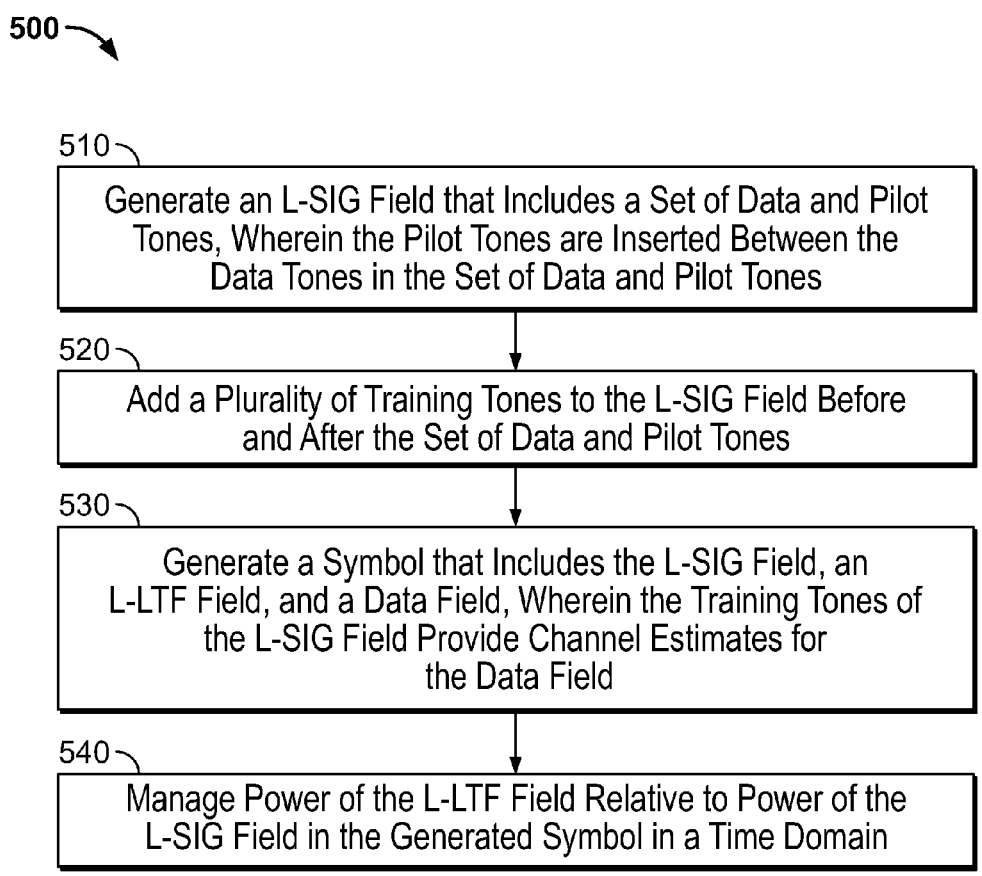
FIG. 5 illustrates a process for increasing the number of training and data tones in a wireless communications system in accordance with an embodiment of the present disclosure.

Control circuitry 110 may be based on any suitable processor or processing circuitry. Control circuitry 110 may control some or all components of wireless communication system 100. Control circuitry 110 may receive and run instructions for implementing a process for transmitting additional training and data tones. Such instructions may be stored in a storage device (not shown) in wireless communication system 100. For example, control circuitry 110 may receive instructions for implementing process 500 (FIG. 5).

Control circuitry 110 may receive data from another system component and may instruct wireless symbol generator 120 to generate a symbol for transmission of the received data in accordance with the 802.11ax protocol. Wireless symbol generator 120 may generate a symbol 300 (FIG. 3) or 400 (FIG. 4) that includes the data and other preamble fields. Wireless symbol generator 120 may provide the generated symbol to transmitter 130 for transmission over one or more antennas to another device (e.g., a receiver).

Transmitter 130 may be any transmitter circuitry that transmits signals in accordance with the 802.11 protocol.

Figure 3:
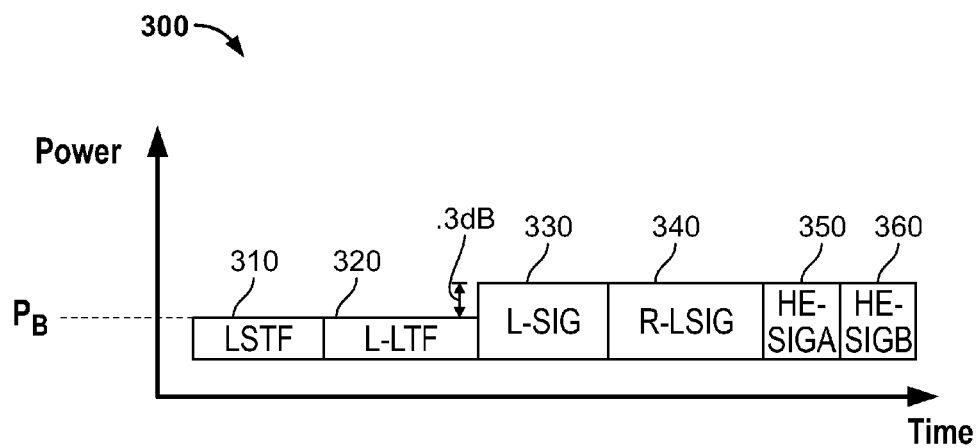
FIGS. 3 and 4 are diagrams of an illustrative power distribution of fields in a frequency and time domain in a wireless communications system in accordance with embodiments of the present disclosure.
Figure 4:
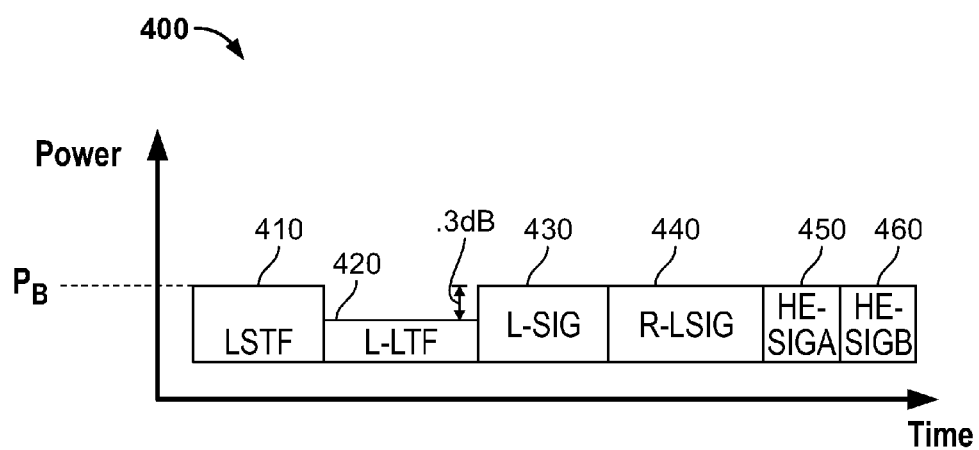

In some embodiments, wireless symbol generator 120 may generate symbol 300 or 400 (FIGS. 3 and 4). Symbol 300 may include the following fields/components: legacy short training field (L-STF) 310, L-LTF 320, legacy signal field (L-SIG) 330, repeat L-SIG (R-LSIG) 340, and high efficiency signal fields (HE-SIGA 350 and HE-SIGB 360). L-LTF 320 may include channel estimation information that is used by a receiver to decode information in HE-SIGA 350 and/or HE-SIGB 360. L-LTF 320 may be limited to transmitting only 52 tones (48 data tones and four pilot tones), which also limits the amount of data tones available for transmission in HE-SIGA 350 and/or HE-SIGB 360. This is because there are insufficient training tones available in L-LTF 320 for providing channel estimation for decoding additional data tones in HE-SIGA 350 and/or HE-SIGB 360. As such, HE-SIGA 350 and HE-SIGB 360 may be limited to transmitting 48 data tones. Symbol 400 may include similar fields as symbol 300. Specifically, symbol 400 may include the following fields/components: legacy short training field (L-STF) 410, L-LTF 420, legacy signal field (L-SIG) 430, repeat L-SIG (R-LSIG) 440, and high efficiency signal fields (HE-SIGA 450 and HE-SIGB 460).

In some embodiments, to increase the number of data tones that can be transmitted in, for example, HE-SIGA 350/450 and/or HE-SIGB 360/460, wireless symbol generator 120 may add a plurality of training tones (e.g., four additional training tones) to L-SIG 330/430. The plurality of training tones added to L-SIG 330/430 may provide channel estimate information for decoding information in subsequent fields, such as HE-SIGA 350/450 and/or HE-SIGB 360/460. By adding the plurality of training tones (e.g., four additional training tones), HE-SIGA 350/450 and HE-SIGB 360/460 may transmit 52 data tones instead of only 48.

Figure 2:
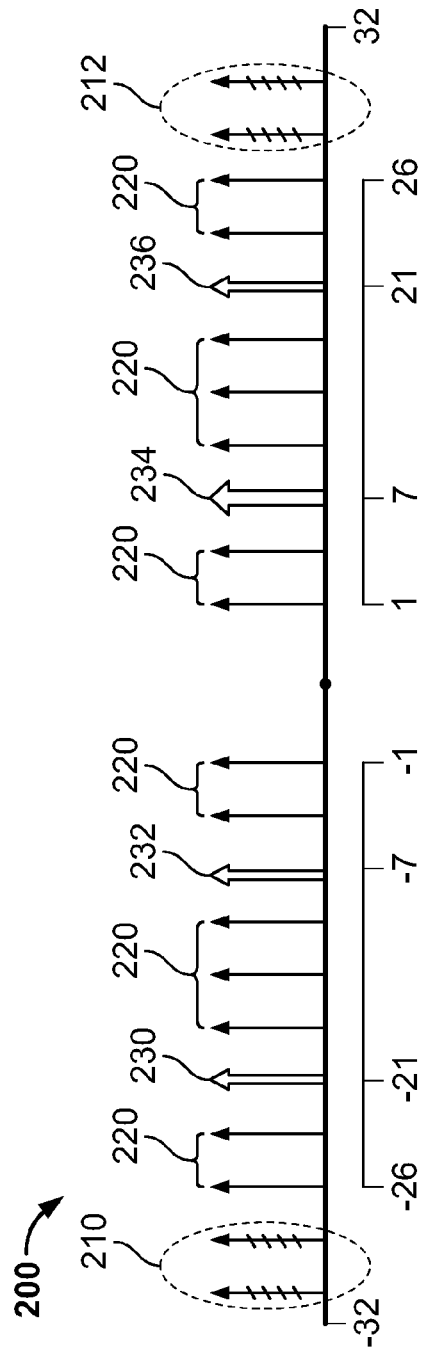
FIG. 2 is a diagram of an illustrative preamble with additional training, pilot and data tones in accordance with an embodiment of the present disclosure.

FIG. 2 is a diagram of an illustrative preamble 200 with additional training, pilot and data tones in accordance with an embodiment of the present disclosure. Preamble 200 may represent L-SIG 330/430 generated by wireless symbol generator 120. Specifically, preamble 200 may initially include a total of 52 tones that includes a set of data tones 220 (e.g., 48 data tones) and pilot tones 230, 232, 234 and 236 (e.g., four pilot tones). Pilot tones 230, 232, 234 and 236 may be placed at respective positions −21, −7, 7 and 21, and data tones 220 may be positioned among pilot tones 230, 232, 234 and 236 at a remaining set of positions. Wireless symbol generator 120 may insert a plurality of training tones 210 and 212 before and after the set of data tones 220 and pilot tones 230, 232, 234 and 236. For example, wireless symbol generator 120 may insert two training tones 210 before the set of data tones and pilot tones 230, 232, 234 and 236 and may insert two training tones 212 after the set of data tones and pilot tones 230, 232, 234 and 236. The resulting preamble 200 (e.g., L-SIG 330/430) may include 56 total tones. Although only four training tones 210 and 212 are shown and described, any number of additional training tones may be added to L-SIG 330/430.

The addition of the plurality of training tones to L-SIG 330/430 may result in power increase in frequency and time for symbol 300/400. Specifically, each tone in L-SIG 330/430 may include a certain amount of power, and adding the plurality of training tones may increase the overall power of L-SIG 330/430 by an amount determined in accordance with 10 log (n/l), where n is the new number of total tones and l is the legacy number of total tones. Specifically, power increases by an amount corresponding to 10 log (56/52)=0.3 dB per tone because 56 tones are now transmitted instead of 52. In some embodiments, wireless symbol generator 120 may include a power management unit for distributing and managing power across frequencies or tones and/or time to address the power resulting from addition of the plurality of training tones to L-SIG 330/430. Specifically, wireless symbol generator 120 may control the overall power of symbol 300/400 in the frequency domain on a per tone basis and/or in the time domain across various fields of symbol 300/400. In some implementations, wireless symbol generator 120 may control or manage the overall power in frequency and/or time to satisfy a predetermined threshold (e.g., a threshold defined by the 802.11ax protocol). In some implementations, wireless symbol generator 120 may manage the overall power to be within 0.3 dB above or below the predetermined threshold. In some embodiments, the predetermined power threshold may be represented by $P_B$ in FIGS. 3 and 4. Specifically, $P_B$ represents the power of a symbol transmitted by wireless symbol generator 120 that includes L-STF, L-LTF, L-SIG, R-LSIG, HE-SIGA and HE-SIGB fields without the addition of the plurality of training tones.

In some embodiments, the power management unit of wireless symbol generator 120 may keep the power of the plurality of added tones the same as the set of data tones 220 and pilot tones 230, 232, 234 and 236. Such an embodiment is illustrated in FIG. 3. In addition, the power management unit of wireless symbol generator 120 may keep the power in other fields of symbol 300 at the same level ($P_B$) as before the addition of the plurality of training tones. Specifically, each tone in the set of data tones 220 and pilot tones 230, 232, 234 and 236 may have a first power value. The added tones 210 and 212 may be added with a power equivalent or that corresponds to the first power value. This results in an increase in power over time in L-SIG by 0.3 dB relative to $P_B$. In such a case, each field of symbol 300 (FIG. 3) may have different heights (e.g., power amount) over time. Accordingly, because the same amount of power is kept the same for each tone in frequency, there is no loss in coverage for L-SIG and the performance of L-SIG is not degraded by the addition of the plurality of training tones. Although there will be a power increase over time for L-SIG 330 (R-LSIG 340) relative to $P_B$, the overall average power across symbols does not change by a significant amount over the standard power requirements meaning such standard power requirements can still be met. As such, the overall performance of L-SIG 330 remains the same as before the addition of the training tones, and additional data tones (e.g., 52 instead of 48) can be included in HE-SIGA 350 and HE-SIGB 360.

In some embodiments, the power management unit of wireless symbol generator 120 may keep the power of L-SIG 430 (and R-LSIG 440) in time the same relative to $P_B$ by reducing the power per tone in frequency in L-SIG 430 (and R-LSIG 440) after adding the plurality of training tones to L-SIG 430 (and R-LSIG 440). Such an embodiment is illustrated in FIG. 4. For example, power management unit of wireless symbol generator 120 may reduce the power per tone in frequency of each tone in L-SIG 430 (and R-LSIG 440) by 0.3 dB such that power across all the tones including the added tones does not exceed Pa. In such circumstances, the power management unit of wireless symbol generator 120 may reduce the power in time of L-LTF 420 relative to PB by an amount that corresponds to the decrease in power per tone of L-SIG 430 (and R-LSIG 440). For example, the power management unit of wireless symbol generator 120 may reduce the power in time of L-LTF field 420 by 0.3 dB. The resulting symbol shown in FIG. 4 has L-LTF 420 with lower height (lower power) than other fields of symbol 400 relative to Pa. By reducing the power in time in other fields of symbol 400 and keeping the power in time the same in L-SIG field 430 as it was before the addition of the plurality of training tones, there may be loss in coverage for L-SIG. Namely, the performance of L-SIG may be degraded by the addition of the plurality of training tones. Specifically, while the power per tone in L-SIG 430 (R-LSIG 440) is reduced, the overall power in time remains unchanged for L-SIG 430 (R-LSIG 440) relative to PB and the power in time of L-LTF 420 is reduced. As such, the overall performance of L-SIG 430 may be degraded compared to the performance of L-SIG 430 before the addition of the training tones, and additional data tones (e.g., 52 instead of 48) can be included in HE-SIGA 350 and HE-SIGB 360.

In some embodiments, the receiver may scale the channel estimates in accordance with the power increase or decrease provided by the power management unit of wireless symbol generator 120. In some implementations, the power management unit of wireless symbol generator 120 may inform the receiver whether and by how much power is increased or decreased by the addition of the plurality of training tones. The receiver may use this information to scale the channel estimates from the L-LTF 320 up or down. For example, the receiver may scale the channel estimates from L-LTF down and/or the channel estimates from L-SIG 330, RL-SIG 340, HE-SIGA 350, HE-SIGB 360 up.

FIG. 5 illustrates a process 500 for increasing number of training and data tones in a wireless communications system in accordance with an embodiment of the present disclosure. At 510, an L-SIG field that includes a set of data and pilot tones is generated. The pilot tones are inserted between the data tones in the set of data and pilot tones. For example, preamble 200 includes a set of data tones 220 and pilot tones 230, 232, 234 and 236 (FIG. 2).

At 520, a plurality of training tones is added to the L-SIG field before and after the set of data and pilot tones. For example, training tones 210 are added before the set of data tones 220 and pilot tones 230, 232, 234 and 236, and training tones 212 are added after the set of data tones 220 and pilot tones 230, 232, 234 and 236 (FIG. 2).

At 530, a symbol that includes the L-SIG field, an L-LTF field, and a data field is generated. The training tones of the L-SIG field provide channel estimates for the data field. For example, wireless symbol generator 120 generates symbol 300, which includes L-LTF 320, L-SIG 330 and data fields (e.g., HE-SIGA 350 and HE-SIGB 360) (FIG. 3) or symbol 400, which includes L-LTF 420, L-SIG 430 and data fields (e.g., HE-SIGA 450 and HE-SIGB 460) (FIG. 4).

At 540, power of the L-LTF field is managed relative to power of the L-SIG field in the generated symbol in a time domain. For example, the power management unit in wireless symbol generator 120 may increase the power of L-SIG 330 and keep the same power in other fields, such as L-LTF field 320 (FIG. 3). Alternatively or in addition, the power management unit in wireless symbol generator 120 may reduce power per tone in L-SIG 430 and may reduce the power in time of another field. For example, the power management unit in wireless symbol generator 120 may reduce the power in time of L-LTF 420 by an amount that corresponds to the amount of power per tone decrease in L-SIG 430 (FIG. 4).

The foregoing describes methods and an apparatus for increasing the number of training and data tones in a wireless communications system. The above-described embodiments of the present disclosure are presented for the purposes of illustration and not of limitation. Furthermore, the present disclosure is not limited to a particular implementation. For example, one or more steps of the methods described above may be performed in a different order (or concurrently) and still achieve desirable results. In addition, the disclosure may be implemented in hardware, such as on an application-specific integrated circuit (ASIC) or on a field-programmable gate array (FPGA). The disclosure may also be implemented in software by, for example, encoding transitory or non-transitory instructions for performing the process discussed above in one or more transitory or non-transitory computer-readable media.

What is claimed is:

1. A method for transmitting data in a wireless communications system, the method comprising:
generating an L-SIG field that includes a set of data and pilot tones, wherein the pilot tones are inserted between the data tones in the set of data and pilot tones;
adding a plurality of training tones to the L-SIG field before and after the set of data and pilot tones;
generating a symbol that includes the L-SIG field, an L-LTF field, and a data field, wherein the training tones of the L-SIG field provide channel estimates for the data field; and
managing power of the L-LTF field relative to power of the L-SIG field in the generated symbol in a time domain.

2. The method of claim 1, wherein the wireless communications system is an 802.11ax wireless communications system.

3. The method of claim 1, wherein managing the power comprises reducing power of the L-LTF field to correspond to the power of the L-SIG field.

4. The method of claim 3 further comprising reducing power of each of the data, pilot, and training tones by 0.3 decibels.

5. The method of claim 1, wherein managing the power comprises increasing the power in the L-SIG field relative to the L-LTF field as a result of adding the plurality of training tones.

6. The method of claim 1, wherein the plurality of training tones includes first, second, third and fourth training tones, wherein the first tone and the second tone are added before the set of data and pilot tones and the third tone and the fourth tone are added after the set of data and pilot tones.

7. The method of claim 1, wherein the data and pilot tones each have a first power value, and wherein adding the training tones comprises adding the training tones with the first power value.

8. The method of claim 1, wherein the symbol includes an L-STF field before the L-LTF field, a repetition of the L-SIG field, and at least one HE-SIG field that follows the L-SIG field.

9. The method of claim 8, wherein the data field corresponds to the at least one HE-SIG field.

10. The method of claim 1, wherein managing the power comprises scaling down the power of each tone in the L-LTF field in accordance with 10 log (n/l), wherein n represents a number of data, pilot, and training tones in the L-SIG field, and l represents a number of data and pilot tones in the L-SIG field.

11. A system for transmitting data in a wireless communications system, the system comprising:
control circuitry configured to:
generate a L-SIG field that includes a set of data and pilot tones, wherein the pilot tones are inserted between the data tones in the set of data and pilot tones;
add a plurality of training tones to the L-SIG field before and after the set of data and pilot tones;
generate a symbol that includes the L-SIG field, an L-LTF field, and a data field, wherein the training tones of the L-SIG field provide channel estimates for the data field; and
manage power of the L-LTF field relative to power of the L-SIG field in the generated symbol in a time domain.

12. The system of claim 11, wherein the wireless communications system is an 802.11ax wireless communications system.

13. The system of claim 11, wherein the control circuitry configured to manage the power is further configured to reduce power of the L-LTF field to correspond to the power of the L-SIG field.

14. The system of claim 13, wherein the control circuitry configured to reduce power is further configured to reduce power of each of the data, pilot, and training tones by 0.3 decibels.

15. The system of claim 11, wherein the control circuitry configured to manage the power is further configured to increase the power in the L-SIG field relative to the L-LTF field as a result of adding the plurality of training tones.

16. The system of claim 11, wherein the plurality of training tones includes first, second, third and fourth training tones, wherein the first tone and the second tone are added before the set of data and pilot tones and the third tone and the fourth tone are added after the set of data and pilot tones.

17. The system of claim 11, wherein the data and pilot tones each have a first power value, and wherein the control circuitry configured to add the training tones is further configured to add the training tones with the first power value.

18. The system of claim 11, wherein the symbol includes an L-STF field before the L-LTF field, a repetition of the L-SIG field, and at least one HE-SIG field that follows the L-SIG field.

19. The system of claim 18, wherein the data field corresponds to the at least one HE-SIG field.

20. The system of claim 11, wherein the control circuitry configured to manage the power is further configured to scale down the power of each tone in the L-LTF field in accordance with 10 log (n/l), wherein n represents a number of data, pilot, and training tones in the L-SIG field, and l represents a number of data and pilot tones in the L-SIG field.

* * * * *